United States Patent
Kristensson et al.

(10) Patent No.: US 12,449,936 B2
(45) Date of Patent: Oct. 21, 2025

(54) METHOD AND APPARATUS FOR ADAPTING OPERATION OF A DEVICE TO TOUCH-SENSOR MALFUNCTIONS

(71) Applicant: Telefonaktiebolaget LM Ericsson (publ), Stockholm (SE)

(72) Inventors: Andreas Kristensson, Södra Sandby (SE); Alexander Hunt, Tygelsjö (SE); Mohammed Zourob, London (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/835,078

(22) PCT Filed: Feb. 9, 2022

(86) PCT No.: PCT/EP2022/053116
§ 371 (c)(1),
(2) Date: Aug. 1, 2024

(87) PCT Pub. No.: WO2023/151787
PCT Pub. Date: Aug. 17, 2023

(65) Prior Publication Data
US 2025/0165097 A1 May 22, 2025

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC .............................. G06F 3/0418; G06F 3/0446
See application file for complete search history.

(56) References Cited

U.S. PATENT DOCUMENTS 5,420,500 A * 5/1995 Kerschner .......... G01R 31/2812
324/755.02
5,956,020 A * 9/1999 D'Amico .............. G06F 3/0418
345/173

(Continued)

OTHER PUBLICATIONS

"Built-in self-test", https://en.wikipedia.org/wiki/Built-in_self-test, Aug. 17, 2021, pp. 1-4.

*Primary Examiner* — Michael Pervan
(74) *Attorney, Agent, or Firm* — Murphy, Bilak & Homiller, PLLC

(57) ABSTRACT

An apparatus (12) and method (400) disclosed herein embody techniques for adapting read operations with respect to a touch sensor (14), to avoid or mitigate touch-detection problems arising from inoperative sensing lines (60) used to detect touch inputs to a touch surface (16) of the touch sensor (14). A particular advantage is that the avoidance or mitigation techniques address instances of touch sensor malfunctioning that involve isolated instances of sensing-line malfunctions. A further advantage is that the technique allows for continued "normal" organization, sizing, and placement of user-interface elements displayed on the touch surface (16)—e.g., a touchscreen display surface—because the technique provides for touch detection in regions of the touch surface (16) affected by inoperative sensing lines (60), at least in cases where an inoperative sensing line (60) is bounded by operative sensing lines (60).

16 Claims, 7 Drawing Sheets

(56) References Cited

U.S. PATENT DOCUMENTS

| | | | | |
|---|---|---|---|---|
| 6,690,156 | B1* | 2/2004 | Weiner | G06T 7/70 273/237 |
| 7,292,229 | B2* | 11/2007 | Morag | G06F 3/04162 345/173 |
| 7,372,455 | B2* | 5/2008 | Perski | G06F 3/0488 345/173 |
| 8,253,425 | B2* | 8/2012 | Reynolds | G01D 3/08 324/519 |
| 9,486,713 | B2* | 11/2016 | Kroyan | B25J 9/1697 |
| 9,652,077 | B2* | 5/2017 | Jenkinson | B25J 9/02 |
| 10,120,474 | B2* | 11/2018 | Jenkinson | B25J 9/02 |
| 10,921,943 | B2* | 2/2021 | Bechstein | G06F 3/0445 |
| 10,953,550 | B2* | 3/2021 | Jenkinson | G06F 11/2221 |
| 11,275,475 | B2* | 3/2022 | Bechstein | G06F 3/0445 |
| 11,592,946 | B1* | 2/2023 | Bechstein | G01L 1/142 |
| 11,724,402 | B2* | 8/2023 | Jenkinson | B25J 9/02 700/250 |
| 2002/0091493 | A1* | 7/2002 | Christopher | G05B 9/02 702/113 |
| 2003/0125887 | A1* | 7/2003 | Ogawa | G01D 1/14 702/66 |
| 2003/0234770 | A1* | 12/2003 | MacKey | G06F 3/0445 345/173 |
| 2004/0183787 | A1* | 9/2004 | Geaghan | G06F 3/0445 345/173 |
| 2006/0092142 | A1* | 5/2006 | Gillespie | G06F 3/04166 345/173 |
| 2006/0092148 | A1* | 5/2006 | Ozawa | G09G 3/3233 345/204 |
| 2007/0200831 | A1* | 8/2007 | Wang | G06F 3/04164 345/173 |
| 2007/0268272 | A1* | 11/2007 | Perski | G06F 3/0446 345/173 |
| 2008/0158183 | A1* | 7/2008 | Hotelling | G06F 3/04164 345/173 |
| 2009/0025987 | A1 | 1/2009 | Perski et al. | |
| 2014/0320437 | A1 | 10/2014 | Kang | |
| 2015/0193074 | A1 | 7/2015 | Cudak et al. | |
| 2016/0085376 | A1 | 3/2016 | Mabie et al. | |
| 2018/0268783 | A1 | 9/2018 | Woo | |
| 2019/0258337 | A1 | 8/2019 | Liu et al. | |
| 2021/0117038 | A1 | 4/2021 | Jain et al. | |

* cited by examiner

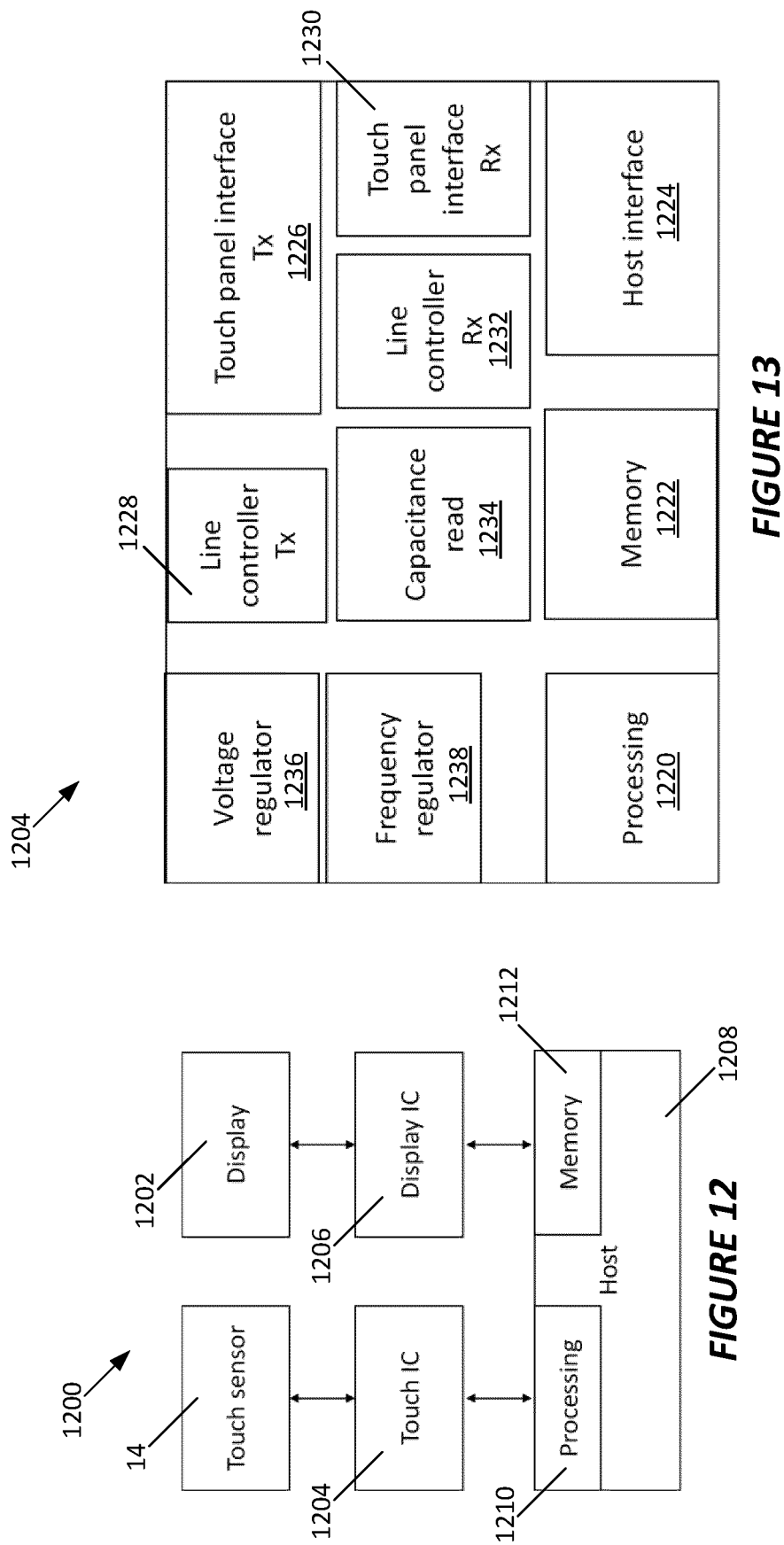

METHOD AND APPARATUS FOR ADAPTING OPERATION OF A DEVICE TO TOUCH-SENSOR MALFUNCTIONS

TECHNICAL FIELD

A method and apparatus provide mitigations to compensate for malfunctioning sensing lines in a touch sensor having a plurality of sensing lines for detecting touch inputs to a touch surface of the touch sensor.

BACKGROUND

Contemporary personal computing devices commonly include some form of touch sensor that is an essential part of the user interface (UI) of the device. For example, a smartphone or a tablet computer relies primarily on a touchscreen to display touchable components of a user interface, with the user controlling most aspects of device operation via touch inputs.

Unfortunately, touch sensors are not immune to malfunctions and such malfunctions have potentially serious implications for controllability and user experience, in the context of touch-based UIs. In cases where the malfunction corresponds to visible damage or where a significant portion of the touch surface is affected, the user may be aware of the malfunction and pursue repair of the device, or at least not be left wondering why the device is not working properly. Further, the device itself may be intelligent enough to avoid using inoperative regions of a touch surface, at least in some scenarios.

More subtle problems arise in cases where a touch surface includes one or more inoperative sensing lines that are surrounded by operative sensing lines. For example, in a touch surface having a row/column grid of sensing lines, an inoperative column (or row) sensing line surrounded by operative column (or row) sensing lines generally would not be discernable to the user and there may be no practical software solution, e.g., in terms of rearranging the UI.

US 2009/025987 A1 discloses a method for testing a digitizer to determine an operative property of the digitizer, wherein the digitizer includes a sensor grid, comprises providing an input signal on a first portion of the sensor grid, detecting at least one output signal in a second portion of the sensor grid responsive to the input signal in the first portion, and determining at least one operative property of the sensor based on the at least one output signal, wherein at least the transmitting, detecting and determining is performed autonomously by the digitizer.

US 2019/258337 A1 discloses a position detection circuit connected to a capacitive touch sensor that includes a plurality of line electrodes arranged in a two-dimensional lattice pattern, the position detection circuit including: at least one processor device; and at least one memory device storing processor-executable instructions which, when executed by the processor device, cause the position detection circuit to: acquire capacitance-related detection values at crossing points of the line electrodes in association with positions of the crossing points; calculate a number of crossing points at which a detection value is smaller than a first threshold for each of the line electrodes; and determine that one or more of the line electrodes for which a calculated number of crossing points is greater than a second threshold are anomalous or possibly anomalous.

SUMMARY

An apparatus and method disclosed herein embody techniques for adapting read operations with respect to a touch sensor, to avoid or mitigate touch-detection problems arising from inoperative sensing lines used to detect touch inputs to a touch surface of the touch sensor. A particular advantage is that the avoidance or mitigation techniques address instances of touch sensor malfunctioning that involve isolated instances of sensing-line malfunctions. A further advantage is that the technique allows for continued "normal" organization, sizing, and placement of user-interface elements displayed on the touch surface—e.g., a touchscreen display surface-because the technique provides for touch detection in regions of the touch surface affected by inoperative sensing lines, at least in cases where an inoperative sensing line is bounded by operative sensing lines.

An example embodiment comprises a method of operation by an apparatus interfaced with a touch sensor. The method includes determining that a sensing line of the touch sensor is not operative and that respective sensing lines running adjacent to the inoperative sensing line are operative. The touch sensor has a plurality of sensing lines arranged for detecting touch inputs to a touch surface of the touch sensor and the method further includes adjusting a touch-detection sensitivity used for evaluating sensing signals output from the adjacent sensing lines, to provide touch detection within a region of the touch surface that corresponds to the inoperative sensing line and is bounded by the adjacent sensing lines. Still further, the method includes evaluating the sensing signals for touch-detection according to the adjusted touch-detection sensitivity.

Another example embodiment comprises an apparatus that includes read circuitry and processing circuitry. The read circuitry is configured to interface with a touch sensor, where the touch sensor has a plurality of sensing lines arranged for detecting touch inputs to a touch surface of the touch sensor. The processing circuitry is configured to: (a) control the read circuitry to excite respective sensing lines of the touch sensor and read corresponding sensing signals output from the touch sensor; (b) determine that a sensing line of the touch sensor is not operative and that respective sensing lines running adjacent to the inoperative sensing line are operative; (c) adjust a touch-detection sensitivity used for evaluating sensing signals output from the adjacent sensing lines, to provide touch detection within a region of the touch surface that corresponds to the inoperative sensing line and is bounded by the adjacent sensing lines; and (d) evaluate the sensing signals for touch-detection according to the adjusted touch-detection sensitivity.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 12 is a block diagram of an example system incorporating a "touch integrated circuit" or "touch IC," according to one embodiment.

FIG. 13 is a block diagram of example details for the touch IC introduced in FIG. 12.

DETAILED DESCRIPTION

Figure 1:
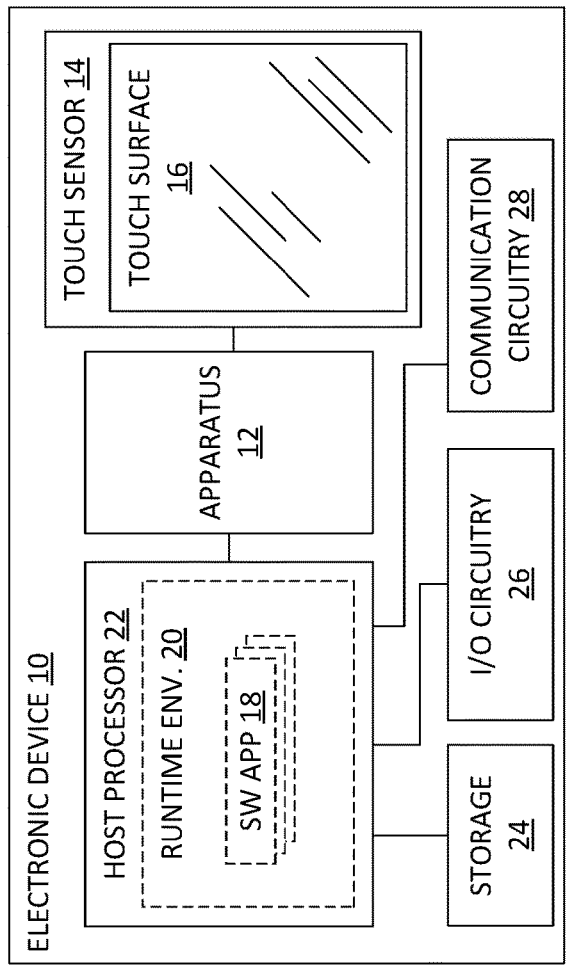
FIG. 1 is a block diagram of an apparatus configured for interfacing with a touch sensor, according to one embodiment, and where the apparatus and touch sensor are shown in an example electronic device.

FIG. 1 illustrates an example electronic device 10 that includes an apparatus 12 that is configured for interfacing with a touch sensor 14, where the touch sensor 14 has a touch surface 16 for detecting touch inputs. The apparatus 12 comprises, for example, an integrated circuit (IC). The touch sensor 14 comprises, for example, a capacitive touchscreen used for displaying information and touch controls associated with one or more software applications 18 executing in a runtime environment 20 provided by a host processor 22 of the electronic device 10.

The electronic device 10 comprises, for example, a smartphone, tablet, or other personal computing device. More broadly, the electronic device 10 may be any type of electronic device that provides a touch sensor for user interaction. Other elements of the example electronic device 10 includes storage 24, e.g., for storing computer programs or data corresponding to the software applications 18. Unless specifically stated or clear from the context, the formulation "A or B" in this disclosure means A alone, B alone, or both A and B.

Further example elements of the electronic device 10 include input/output (I/O) circuitry 26, and communication circuitry 28, e.g., for personal area networking, wireless local access networking, or wide area network. In at least one embodiment, the electronic device 10 comprises a smartphone or other communication device that is configured for use with one or more types of wireless networks, e.g., a cellular network configured according to Third Generation Partnership Project (3GPP) specifications.

The touch sensor 14 comprises, for example, a capacitive touch sensor, and the touch surface 16 comprises or is integrated in a display screen that is used by the software application(s) 18 for outputting information to a user of the electronic device 10 and for receiving touch commands or other touch inputs from the user, e.g., as directed to display touch controls. For example, the software application(s) 18 manage the display of a graphical user interface, with the touch sensor 14 used to detect touch inputs directed to respective elements of the graphical user interface.

Figure 2:
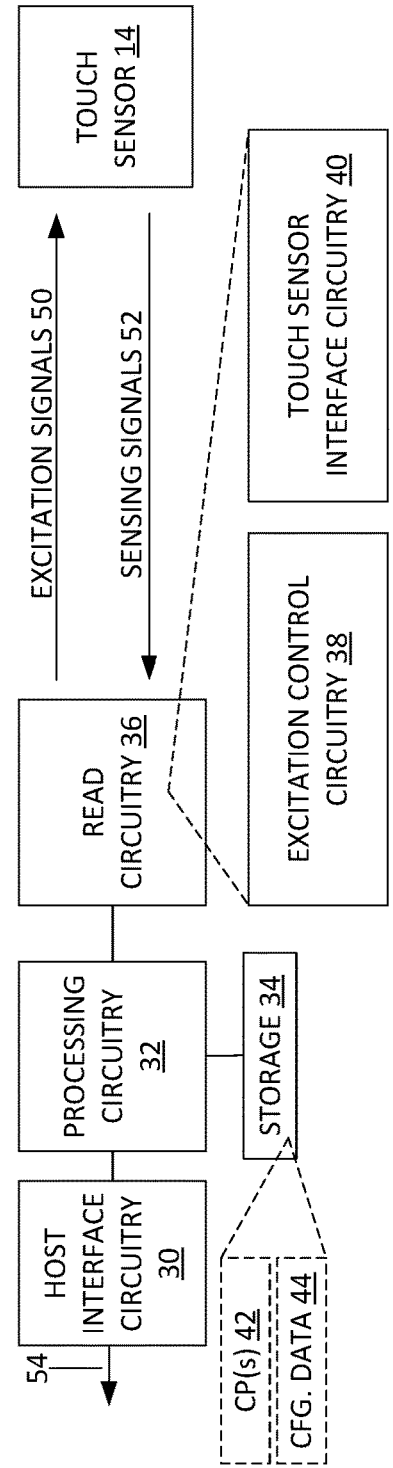
FIG. 2 is a block diagram of example details for the apparatus introduced in FIG. 1, according to one embodiment.

FIG. 2 illustrates example implementation details for the apparatus 12, where the apparatus 12 comprises host interface circuitry 30, processing circuitry 32, which includes or associated with storage 34. Further, the apparatus 12 includes read circuitry 36, which includes excitation control circuitry 38 and touch sensor interface circuitry 40.

The processing circuitry 32 comprises fixed circuitry or programmatically-configured circuitry, or a mix of both fixed and programmatically-configured circuitry. In one or more embodiments, the processing circuitry 32 comprises one or more configured Field Programmable Gate Arrays (FPGAs) or Application Specific Integrated Circuits (ASICs).

In at least one embodiment, the processing circuitry 32 comprises one or more microprocessors that are specially adapted to operate the processing circuitry 32, based on the execution of stored computer program instructions comprised in one or more computer programs 42 ("CP(s)" in the diagram. The computer program(s) 42 are stored in the storage 34 and the storage 34 in such embodiments comprises one or more types of computer-readable media, e.g., volatile storage for live program execution and non-volatile storage for longer-term storage of the computer program(s) 42. The storage 34 also may hold one or more types of configuration data 44 ("CFG. DATA" in the diagram), e.g., configuration data regarding the touch sensor 14 or other configuration settings. Example types of circuitry encompassed in the storage 34 include any one or more of SRAM, NV-RAM, EEPROM, FLASH, and Solid State Disk (SSD).

Regardless of its particular implementation details, the apparatus 12 "reads" the touch sensor 14 based on outputting excitation signals 50 and receiving corresponding sensing signals 52. By evaluating the sensing signals 52, the processing circuitry 32 determines the presence or absence of touch inputs to the touch surface 16 and, in at least one embodiment, resolves the touch locations, e.g., according to a coordinate framework applicable to the touch surface 16. Reading operations may be based on time-domain or frequency-domain evaluations. For example, the excitation signals 50 comprise frequency signals, e.g., specific tones, and the sensing signals comprise the same tones but have amplitudes that depend on whether corresponding regions of the touch surface 16 are being touched.

Figure 3:
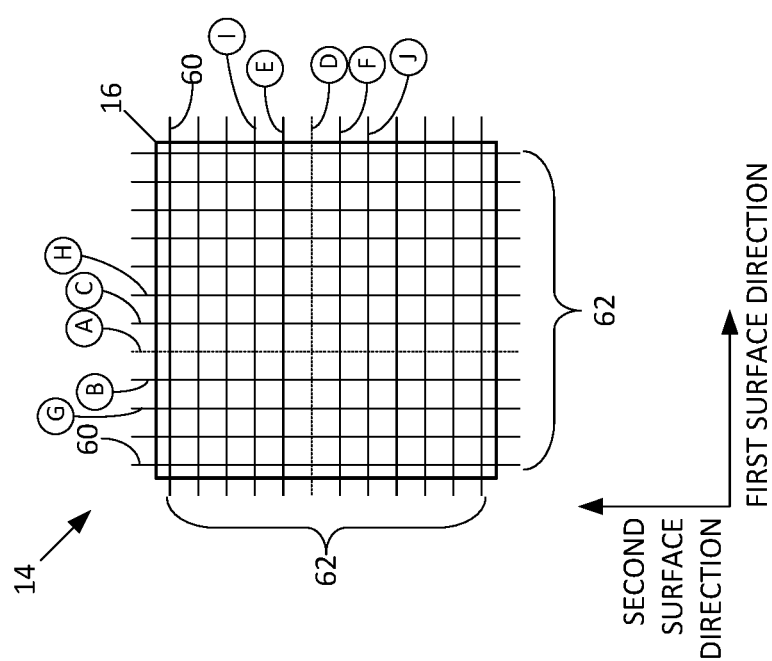
FIG. 3 is a diagram illustrating an example arrangement of sensing lines of a touch sensor, for detecting touch inputs to a touch surface of the touch sensor.

FIG. 3 provides example details supporting further discussion of how the apparatus 12 reads a touch sensor 14, for an example touch sensor 14 having one or more pluralities 62 of sensing lines 60 arrayed in the touch surface 16. Here, "arrayed in" is a phrase of convenience and it encompasses any arrangement for arraying the sensing lines 60 with respect to the touch surface 16—e.g., the sensing lines 60 may be on the touch-side (top) of the touch surface 16, or they may be on the non-touch side (underside) of the touch surface 16, or they may be in the touch surface 16, e.g., in cases where the touch surface 16 is a multi-layered assembly.

In implementations where the touch sensor 14 is a capacitive touch sensor, the sensing lines 60 are capacitive lines that are directly or indirectly energized via respective excitation signals 50 and output corresponding sensing signals 52. The sensing signal 52 output from a given sensing line 60 has a signal amplitude that depends on whether the additional capacitance associated with touch inputs is or is not present in a surface region corresponding to the given sensing line 60.

According to its advantageous configuration and corresponding operation, the apparatus 12 detects the presence of malfunctioning sensing lines 60 and adjusts its reading operation to provide for touch detection in the touch-surface region corresponding to the malfunctioning sensing lines 60. Particularly, the processing circuitry 12 detects and compensates touch detection for malfunctioning sensing lines 60 that have functioning sensing lines 60 on either side of them.

For example, FIG. 3 depicts a first plurality 62 of sensing lines 60 that run in a first surface direction—i.e., in a "row" orientation in the example depiction. A second plurality 62 of sensing lines 60 run in a second surface direction—i.e., in a "column" orientation in the example depiction. Other orientations are possible, e.g., diagonal orientations, and the sensing lines 60 need not be straight lines.

The sensing line 60 shown as line "A" is dashed to indicate an inoperative condition. Line "B" runs adjacent to line A on one side of line A, while line "C" runs adjacent to line A on the other side of line A. If lines B and C are operative, the touch-sensor reading technique disclosed herein allows for touch detection within the region of the touch surface 16 lying between lines B and C, e.g., by adapting the evaluation of sensing signals 52 output from lines B and C to account for the "missing" line A.

From FIG. 3, one sensing line 60 is adjacent to another sensing line 60 if it is immediately next to the other sensing line 60 in an array-position sense, and runs with the other sensing line 60—i.e., has the same directional sense/orientation. Thus, lines B and C are adjacent to line A and the sensing lines 60 that are labeled as lines "E" and "F" are adjacent to the sensing line 60 that is labeled as line "D." Lines D, E, and F run in the first surface direction and belong to the plurality 62 of sensing lines 60 that run in the first surface direction. Assuming that line D is inoperative and that lines E and F are operative, the touch-sensor reading technique disclosed herein provides touch detection within the region of the touch surface 16 lying between lines E and F, by adapting the evaluation of sensing signals 52 output from lines B and C to account for the missing line D.

The technique in one or more embodiments involves further adaptations for evaluating the sensing signals 52 output from "secondary" adjacent sensing lines 60. A "secondary" adjacent sensing line 60 is adjacent to a sensing line 60 that is adjacent to an inoperative sensing line 60. In the diagram, the sensing lines 60 that are labeled as lines "G" and "H" are secondary adjacent sensing lines with respect to line A. Similarly, the sensing lines 60 that are labeled as lines "I" and "J" are secondary sensing lines with respect to line D. Use of adjacent sensing lines 60 for touch detection within surface regions containing inoperative sensing lines 60 requires that the adjacent sensing lines 60 be operative. Likewise, any use of the secondary adjacent sensing lines 60 requires that they be operative.

Figure 4:
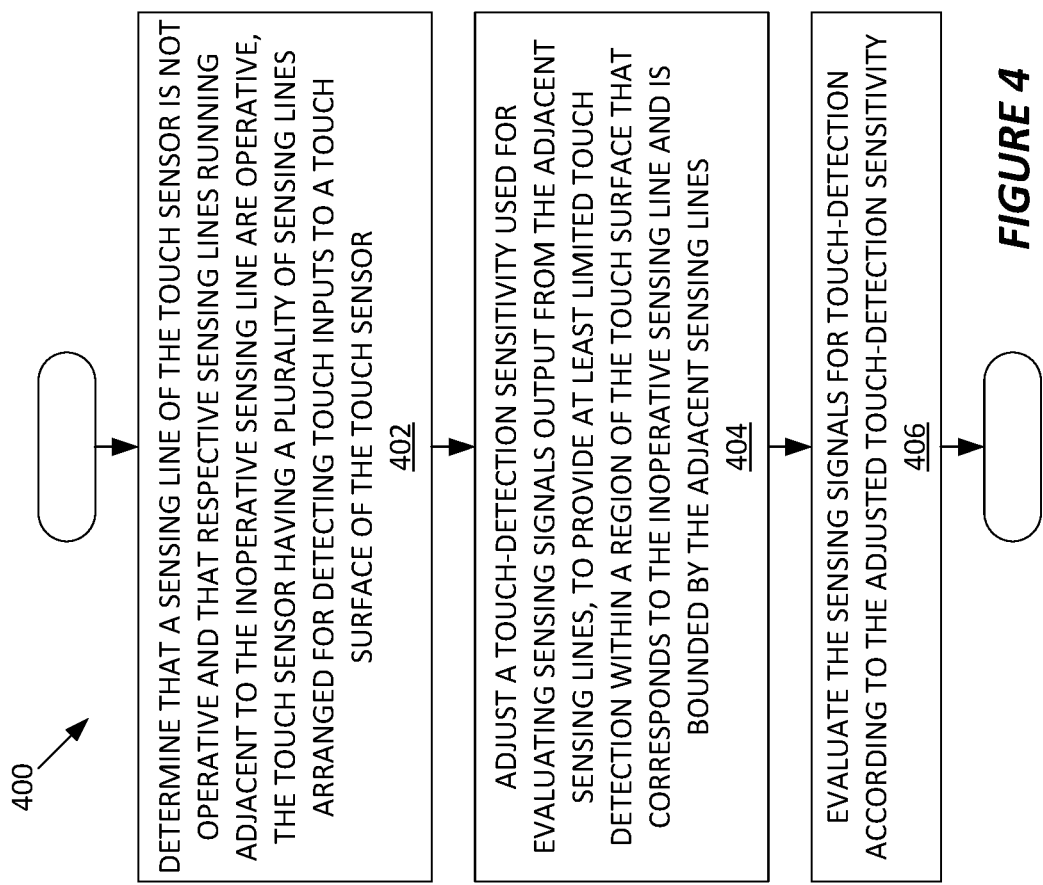
FIG. 4 is a logic flow diagram of a method of operation by an apparatus, according to one embodiment.

FIG. 4 illustrates a method 400 of operation by an apparatus 12 interfaced with a touch sensor 14. The method 400 includes: determining (Block 402) that a sensing line 60 of the touch sensor 14 is not operative and that respective sensing lines 60 running adjacent to the inoperative sensing line 60 are operative, where the touch sensor 14 has a plurality 62 of sensing lines 60 arranged for detecting touch inputs to a touch surface 16 of the touch sensor 14; adjusting (Block 404) a touch-detection sensitivity used for evaluating sensing signals 52 output from the adjacent sensing lines 60, to provide touch detection within a region of the touch surface 16 that corresponds to the inoperative sensing line 60 and is bounded by the adjacent sensing lines 60; and evaluating (Block 406) the sensing signals 52 for touch-detection according to the adjusted touch-detection sensitivity.

This reference to "the sensing signals 52" refers to the sensing signals 52 output from the adjacent sensing lines 60. The adjusted touch-detection sensitivity is not globally applied to all sensing signals 52 obtained from the touch sensor 14. One example of adjusting the touch-detection sensitivity is changing a signal threshold used to evaluate the sensing signals 52 output from the sensing lines that are adjacent to the inoperative sensing line 60. For example, the signal threshold used to detect touch inputs may be lowered or otherwise shaped, to account for the effective reduction in sensing-line pitch arising from loss of the inoperative sensing line 60 between the two adjacent sensing lines 60. Adjusting the signal threshold compensates for the fact that the spacing between the two adjacent sensing lines 60 is twice that of the nominal sensing-line spacing, i.e., pitch.

The method 400 in one or more embodiments further comprises adjusting an excitation frequency used to produce the sensing signals 52 from the adjacent sensing lines 60, in conjunction with adjusting the touch-detection sensitivity. That is, at least with respect to the excitation signals 50 that "produce" the sensing signals 52 obtained from the adjacent sensing lines 60, the apparatus 12 adjusts the excitation frequency. "Excitation frequency" refers to the frequency of an excitation signal 50 that is applied to a sensing line 60 to obtain a corresponding sensing signal 52 from that sensing line 60 or from another sensing line 60. In an example capacitive-coupling arrangement, energizing a given sensing line 60 with an excitation signal 50 produces one or more corresponding sensing signals 52, as output from one or more other sensing lines 60 that are capacitively coupled to the energized sensing line 60. A specific tone or tones may be used to energize the sensing lines 60 associated with producing sensing signals 52 from the sensing lines 60 that are adjacent to an inoperative sensing line 60. An energized sensing line 60 may be referred to as a "TX line" and a sensing line 60 monitored for a corresponding sensing signal 52 may be referred to as an "RX line".

The method 400 in one or more embodiments further comprises adjusting an excitation voltage used to produce the sensing signals 52, in conjunction with adjusting the touch-detection sensitivity. The excitation-voltage adjustment in one or more embodiments is limited to the excitation signals 50 that are applied to the touch sensor 14 for obtaining sensing signals 52 from the sensing lines 60 that are adjacent to the inoperative sensing line. The adjustment comprises using a higher voltage, for example, to compensate for an effective reduction in sensing-line pitch arising from the inoperative sensing line 60. In at least one embodiment, adjusting the touch-detection sensitivity comprises, for example, using a non-linear touch-detection threshold for evaluating an amplitude of the sensing signals 52 output from the adjacent sensing lines 60. The non-linear touch-detection threshold is dependent upon the adjusted excitation voltage.

The method 400 in one or more embodiments includes adjusting the touch-detection sensitivity for sensing signals output from adjacent sensing lines 60, e.g., by using a non-linear touch-detection threshold for evaluating amplitudes of the sensing signals 52. The non-linear touch-detection threshold may be used with or without use of adjusted excitation frequencies or adjusted excitation voltages in relation to producing the sensing signals 52 that are evaluated using the non-linear touch detection threshold.

In at least one embodiment, the method 400 further comprises adjusting a touch-detection sensitivity used for reading secondary adjacent sensing lines 60 to account for the adjusted excitation voltage used with respect to the adjacent sensing lines 60. As explained earlier, for any given inoperative sensing line 60, the sensing lines 60 that run next to it in an array-position sense are "adjacent" sensing lines 60. A secondary adjacent sensing line 60 runs next to an adjacent sensing line 60.

In one or more embodiments, the method 400 further comprises at least one of skipping energization of the inoperative sensing line 60 when reading the touch sensor 14 for detection of touch inputs or skipping evaluation of a sensing signal 52 output from the inoperative sensing line 60 when reading the touch sensor 14 for detection of touch inputs.

Further, at least one embodiment of the method 400 includes ignoring any sensing signal 52 output from the inoperative sensing line 60 and calculating a location of a touch input detected in the region of the touch surface 16 that corresponds to the inoperative sensing line 60 as a function of the sensing signal 52 output from one of the adjacent sensing lines 60 in relation to the sensing signal 52 output from the other one of the adjacent sensing lines 60. For example, the respective amplitudes of the sensing signals 52 output from the respective adjacent sensing lines 60 indicate where a detected touch input is located, between the two adjacent sensing lines 60.

As seen in FIG. 3, the sensing lines 60 arrayed in a touch surface 16 of a touch sensor 14 may comprise more than one plurality—e.g., may comprise first and second pluralities (62) of sensing lines 60, with the sensing lines 60 in one plurality 62 running crisscross with the sensing lines 60 in the other plurality 62. In at least one embodiment, the method 400 comprises detecting bounded sensing lines 60 in either plurality 62. Any particular sensing line 60 is a "bounded" sensing line 60 if the particular sensing line 60 is inoperative and the adjacent sensing lines 60 are operative. For each bounded sensing line 60, the method 400 includes adjusting the touch-detection sensitivity used for evaluating sensing signals 52 output from each pair of adjacent sensing lines 60, and evaluating the sensing signals 52 from each pair of adjacent sensing lines 60 for touch-detection according to the adjusted touch-detection sensitivity.

The method 400 in one or more embodiments further comprises sending signaling 54 to a host processor 22 of an electronic device 10 that includes the touch IC or other apparatus performing the method 400 and further includes the touch sensor 14, to thereby enable software-based mitigation with respect to an inoperative sensing line 60 affecting use of the touch sensor 14 as an input to one or more software applications 18 executing on the host processor 22. Again, the method 400 may be limited to use with bounded sensing lines 60, where each bounded sensing line 60 is an inoperative sensing line 60 having operative adjacent sensing lines 60. As noted, the plurality/pluralities 62 of sensing lines 60 comprise capacitive lines, in one or more embodiments. Such capacitive lines are configured for capacitance-based detection of touch inputs to the touch surface 16 of the touch sensor 14.

Figure 6:
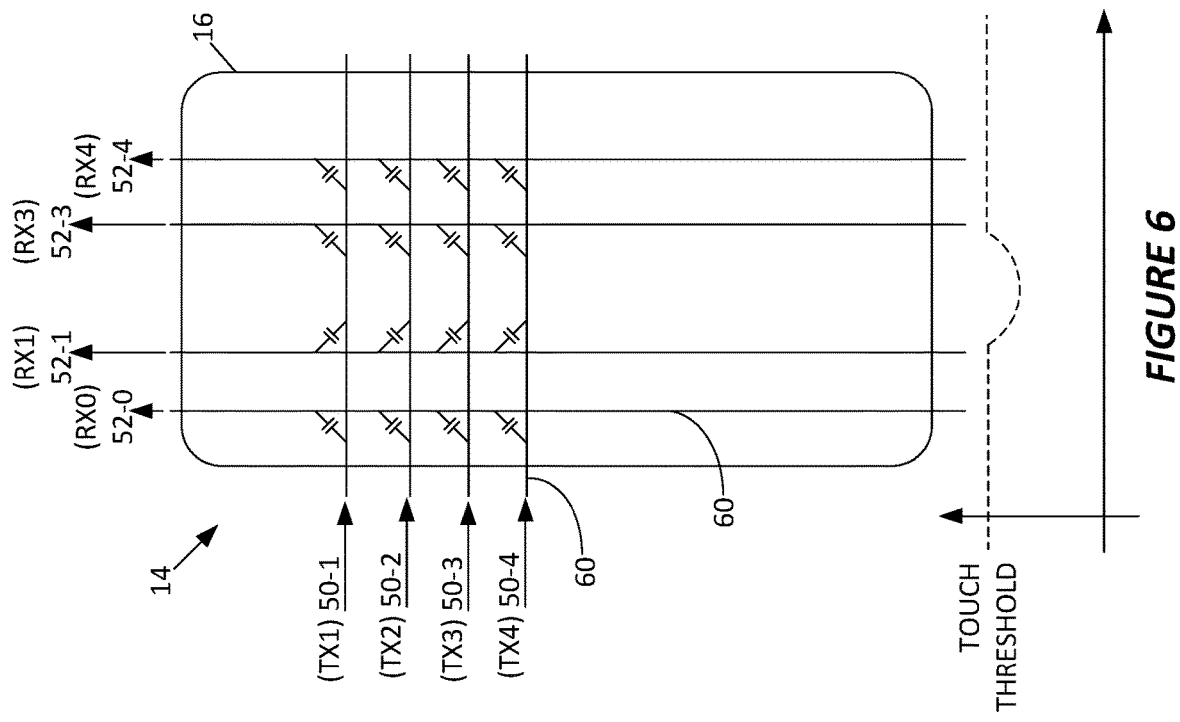
FIGS. 5-8 are schematic diagrams illustrating example adjustments made to touch-detection sensitivity, for providing touch detection in a touch-surface area corresponding to an inoperative sensing line of a touch sensor.
Figure 5:
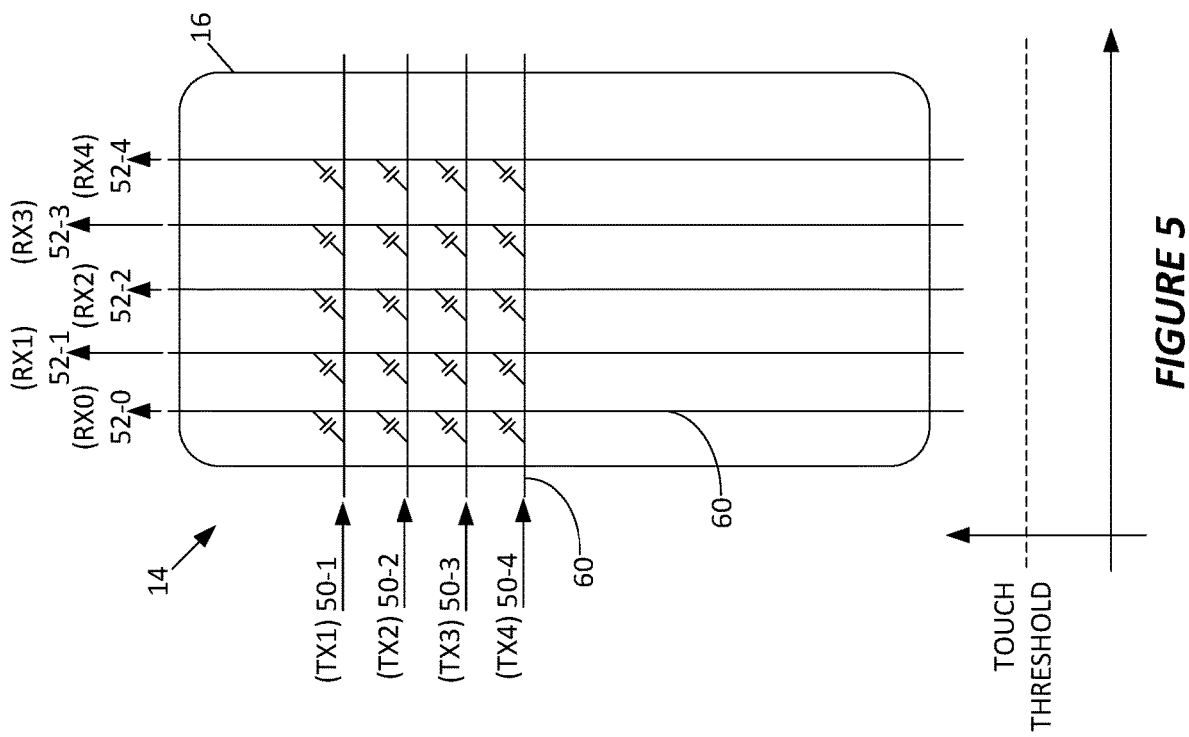

FIGS. 5 and 6 illustrate example details consistent with reading a touch sensor 14 according to the method 400, for an example touch-sensor configuration. In the example illustrations, FIG. 5 depicts all sensing lines 60 as operative, whereas FIG. 6 depicts an example failure case where one sensing line 60 is inoperative.

In FIG. 5, four sensing lines 60 are oriented as "row lines" and five sensing lines 60 are oriented as "column lines." The row and column lines are capacitively coupled, such that driving the row lines with excitation signals 50-1, 50-2, 50-3, and 50-4 results in the column lines outputting corresponding sensing signals 52-0, 52-1, 52-2, 52-3, and 53-4. Although not illustrated in FIG. 5, a complete read "cycle" for the depicted configuration of touch sensor 14 includes driving the row lines and evaluating the sensing signals 52 output from the column lines, and then driving the column lines and evaluating the sensing signals 52 output from the row lines.

FIG. 6 illustrates the same arrangement but where the column line labeled RX2 is inoperative and, therefore, omitted from the illustration. The column lines labeled RX1 and RX3 are adjacent to the RX2 line, and the sensing signals 52-1 and 52-3 output from lines RX1 and RX3 are used to detect touch inputs in the touch surface region between the lines RX1 and RX3.

In comparing touch detection between FIGS. 5 and 6, FIG. 5 depicts a nominal evaluation-signal threshold—"touch threshold"—to be used for touch detection with respect to the sensing signals 52 output from the respective column lines RX0, RX1, RX2, RX3, and RX4. Conversely, FIG. 6 depicts the use of an adjusted touch-detection sensitivity, based on altering the evaluation-signal threshold used for touch detection with respect to the sensing signals 52 output from the column lines adjacent to the inoperative column line—i.e., the depicted touch-detection threshold is used to evaluate the presence/location of touch inputs occurring between column lines RX1 and RX3, as reflected in the evaluation signals 52-1 and 52-3 output from them.

In more detail, FIG. 6 illustrates that the touch threshold has a non-linear dip to accommodate with respect to touch detection in the screen regions between RX1 and RX2—i.e., region in which the inoperative column line RX2 lies. Because of the longer line-to-line distance between RX1 and RX3, as compared to the RX1-to-RX2 and RX2-to-RX3 distances, touch inputs to the affected screen region may not be detected absent application of the lowered touch threshold in that region. Another point to note is that the baseline or level portion of the touch threshold shown in FIG. 6 is higher than the touch threshold shown in FIG. 5. This difference reflects the user of higher-excitation voltages in view of the inoperative column line RX2, where use of the higher excitation voltages yields higher voltages for the sensing signals 52, meaning that the dipped portion of the touch threshold in FIG. 6 is comfortably above the involved noise floor. If the involved system is quiet—i.e., has a low noise floor—the baseline touch threshold does not need to be raised.

Figure 8:
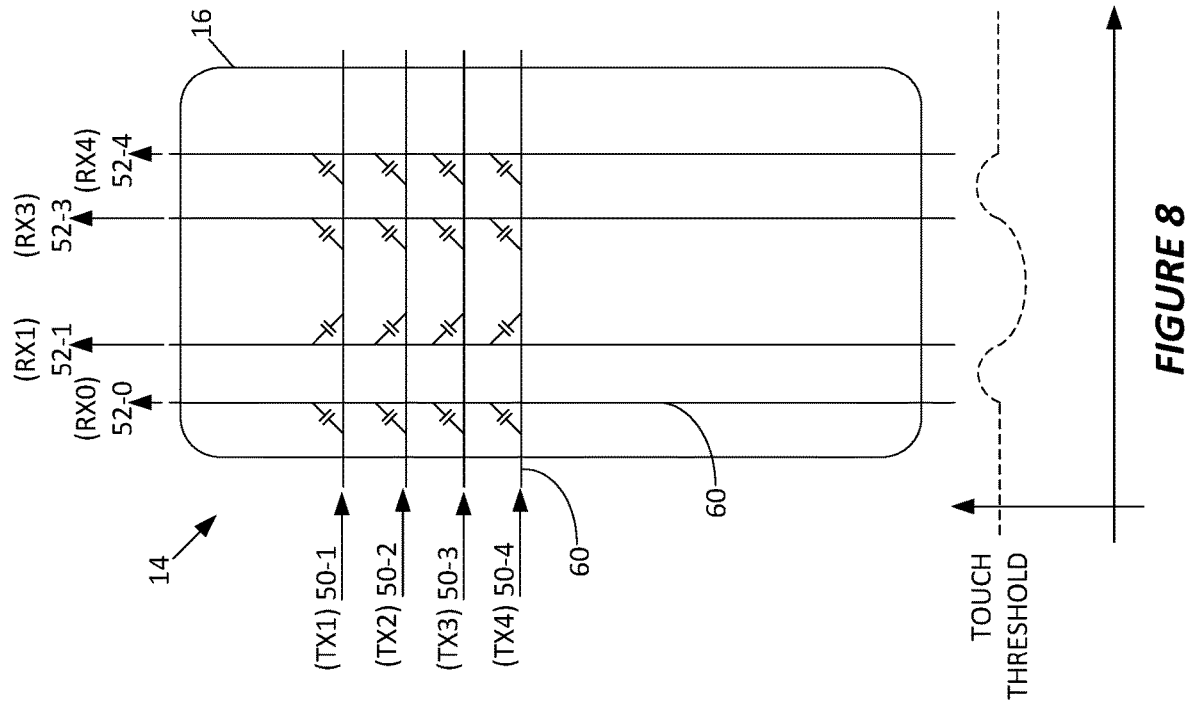
Figure 7:
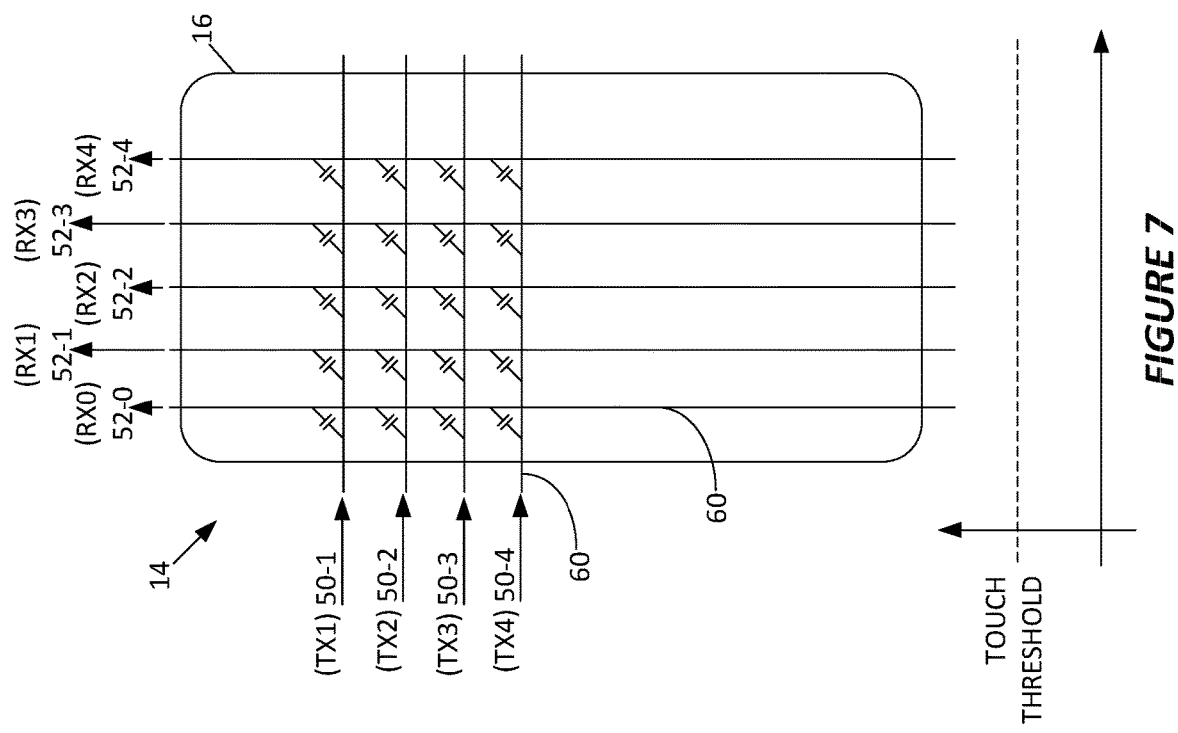

FIGS. 7 and 8 are similar to FIGS. 5 and 6, except that FIG. 8 illustrates how the touch-detection threshold may be adjusted with respect to the adjacent column lines RX1 and RX3, and further with respect to the secondary adjacent column lines RX0 and RX4. Note that these signal—level threshold adaptations may be used in conjunction with adapting the drive signals—i.e., with adapting the excitation signals 50 in terms of frequency or amplitude.

In particular, the touch threshold shown in FIG. 8 assumes that the sensitivity (gain) has been increased with respect to the operative column lines RX1 and RX3, which means that touch inputs in the screen regions corresponding to those lines result in a larger touch response. Hence, touch threshold is bumped upwards with respect to the screen regions between RX0 and RX1 and between RX3 and RX4. Additionally, as seen in FIG. 6, for touch detection in the larger span between RX1 and RX3, with RX2 inoperative, the touch threshold is dipped downward, to account for the reduced touch-input sensitivity.

Figure 9:
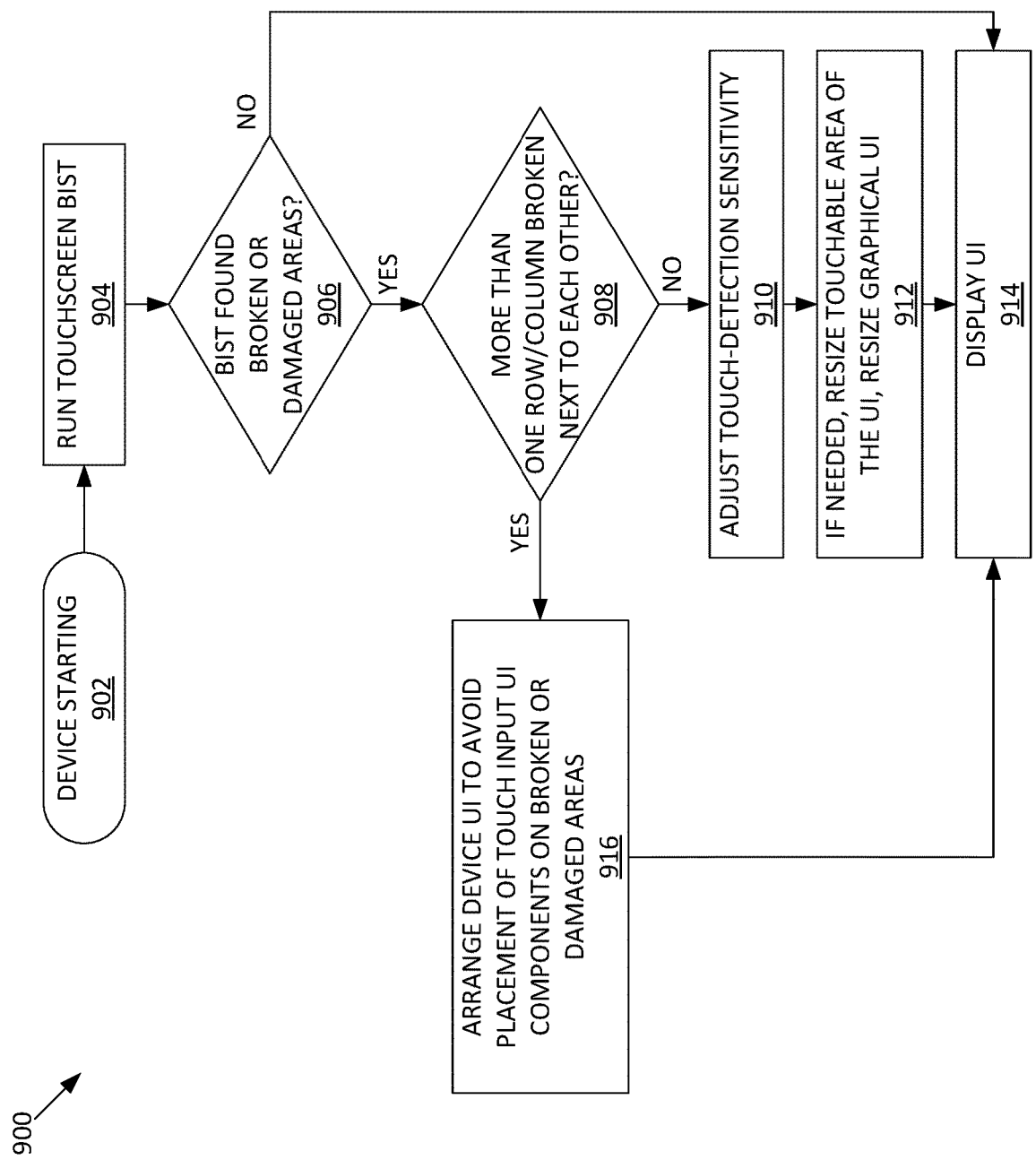
FIG. 9 is a logic flow diagram of a method of operation by an apparatus, according to one embodiment.

FIG. 9 illustrates a method 900 of operation, which can be understood as an implementation of the method 400 according to one or more embodiments. The electronic device 10 starts operation (Block 902) and runs a built-in-self-test (BIST) on the touch sensor 14 (Block 904). If the BIST finds broken or damaged touch areas (YES from Block 906), processing continues with determining whether more than one consecutive row or column line is broken (Block 908). If not, processing continues with adjusting the touch-detection sensitivity with respect to the individual column or row lines that are broken (Block 910), optionally resizing affected areas of a user interface (UI) to be displayed (Block 912), and displaying the UI (Block 914).

Figure 11:
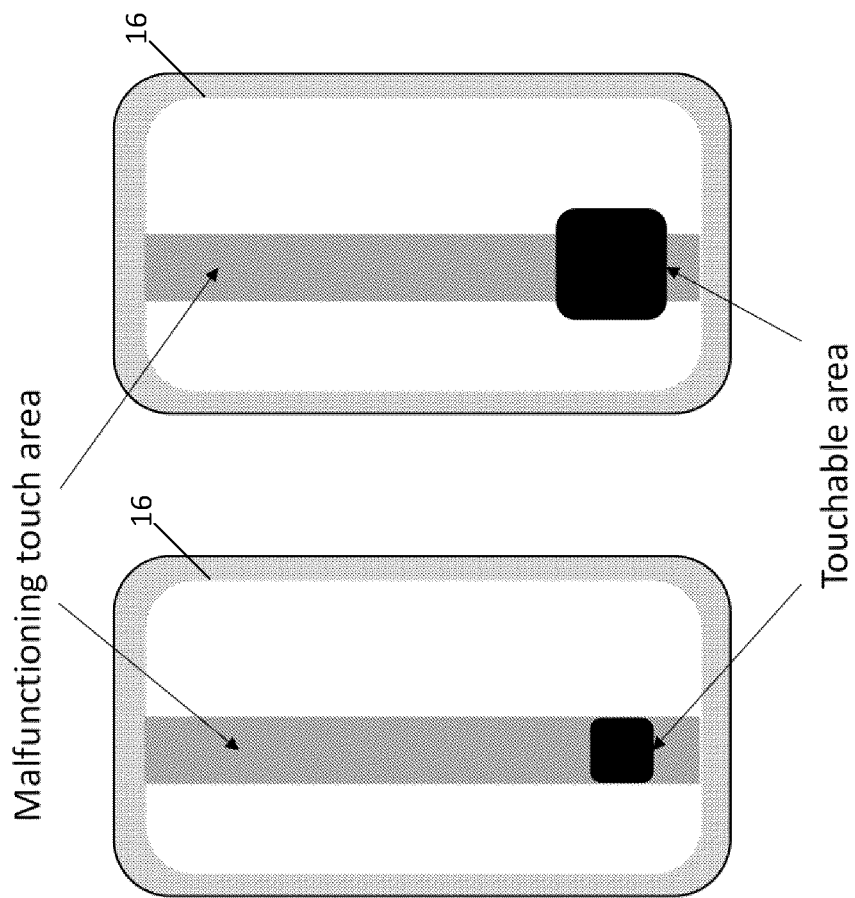
FIGS. 10 and 11 are diagrams of an example touch sensor having an inoperative sensing line running in a "columnar" orientation, with corresponding depictions of the affected touch region.
Figure 10:
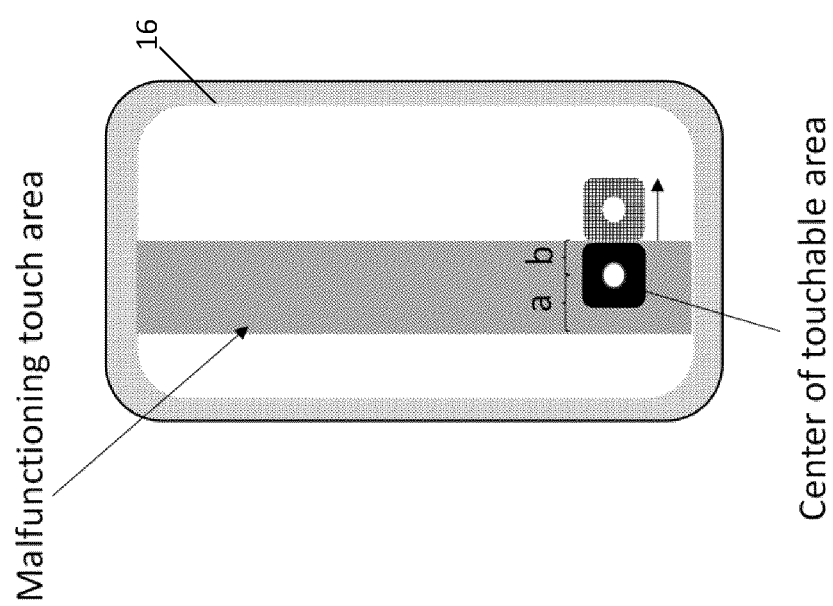

If there are consecutive broken row lines or column lines (YES from Block 908), processing includes arranging/rearranging the UE to avoid placement of touch-input components of the UI on broken or damaged areas (Block 916). FIGS. 10 and 11 illustrate an example where a malfunctioning touch area on a touch surface 16 spans two or more consecutive broken column lines. FIG. 10 depicts moving a touchable UI component laterally, to move it outside the affected region of the touch surface 16. FIG. 11 illustrates another adaptation, in which a touchable UI component is enlarged, to compensate for broken column lines.

FIG. 12 illustrates an example system 1200, with the system 1200 comprising a touch sensor 14, a display 1202, a touch IC 1204, a display IC 1206, a host 1208 comprising one or more processors 1210 and supporting memory 1212. The touch sensor 14 may be integrated with the display 1202, e.g., the touch surface 16 may be a transparent overlay on the display 1202, where the display 1202 is a graphical computer display configured for displaying a touch-driven UI.

The touch IC 1204 is an example of the apparatus 12 introduced in FIG. 1, whereas the display IC 1206 is configured for generating graphical content for the display 1202 and controlling operation of the display 1202. The host 1208 interfaces to the display 1202 via the display IC 1206 and interfaces to the touch sensor 14 via the touch IC 1204. The processor(s) 1210 of the host 1208 comprise, for example, one or more Central Processing Units (CPUs), Graphics Processing Units (GPUs), or Neural Processing Units (NPUs).

FIG. 13 illustrates an example implementation of the touch IC 1204. The example touch IC 1204 includes one or more processors 1220 and associated memory 1222, along with a host interface 1224, a touch panel drive (TX) interface 1226 and an associated drive controller 1228. The drive interface 1226 and drive controller 1228 control the application of excitation signals 50 to the touch sensor 14, while receiver interface 1230 and corresponding receiver controller 1232 provide for reception of sensing signals 52 output from the touch sensor 14 in conjunction with application of the excitation signals 50. A capacitance read circuit 1234 provides at least initial processing for the sensing signals 52, with the one or more processors 1220 providing overall touch detection control and adaptations of touch-detection sensitivity as disclosed herein. Further, a voltage regulator 1236 provides regulated voltage(s) to the various elements of the touch IC 1204, while a frequency regulator 1238 provides the tone(s) used for the excitation signals 52.

The touch IC 1204 in an example configuration uses BIST information to change the scan of the touch sensor 14, so that the malfunctioning sensing lines 60 are not scanned, i.e., the capacitance is measured between the two sensing lines 60 that are adjacent to any single non-working sensing line 60. In at least some embodiments, the touch IC 1204 evaluates the signal level of the sensing signals 52 output from the sensing lines 60 that are adjacent to a malfunctioning sensing line 60, to determine whether the signal level is sufficient for reliable operation, e.g., in comparison to some nominal threshold. If the signal level is not high enough, the touch IC 1204 in one or more embodiments adjust the excitation voltage and possibly the excitation frequency applied to the TX lines to increase the signal to noise level. The voltage and signal frequency are increased only for touch-surface areas where needed, e.g., for the adjacent sensing lines 60 and, possibly, the secondary adjacent sensing lines 60.

Depending on the implementation of the touch IC 1204, multiple sensing lines 60 can be scanned in parallel or may be excited/sensed using a multiplexed or scanning arrangement, or a hybrid parallel/multiplexed approach may be used. When the voltage of the excitation signal 50 applied to a sensing line 60 is increased, the increase affects the neighboring lines on the side where there are no malfunctions. The higher signal voltage needs to be considered by the touch IC 1204 when the reading of the touch sensor 14 is performed and the signal level used as the touch-detection threshold need to be adjusted accordingly to be able to make sure that there are no ghost touches. Such functions and level compensations may be configured in a fixed manner, in the design of the touch IC 1204, so that the processor(s) 1210 correctly detect touches in touch-surface regions affected by single broken sensing lines 60.

When there are single broken sensing lines 60 detected for the touch surface 16, reading of the touch sensor 14 may be adapted in two ways. The reading is performed "normally but the sensing signal(s) 52 from the broken sensing line(s) 60 are not used in any calculations of the touch position input. In another approach, the touch IC 1204 avoids energizing/reading the broken sensing line(s) 60 and, of course, omits them from consideration in touch-detection calculations. Such control may be performed via appropriate configuration of the transmitter and receiver line controllers 1228 and 1232 shown in FIG. 13.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operation by an apparatus interfaced with a touch sensor, the method comprising:
   determining that a sensing line of the touch sensor is not operative and that respective sensing lines running adjacent to the inoperative sensing line are operative, the touch sensor having a plurality of sensing lines arranged for detecting touch inputs to a touch surface of the touch sensor;
   adjusting a touch-detection sensitivity used for evaluating sensing signals output from the adjacent sensing lines, to provide touch detection within a region of the touch surface that corresponds to the inoperative sensing line and is bounded by the adjacent sensing lines;
   adjusting one or both of an excitation frequency or an excitation voltage used to produce the sensing signals, in conjunction with adjusting the touch-detection sensitivity; and
   evaluating the sensing signals for touch-detection according to the adjusted touch-detection sensitivity.

2. The method of claim 1, wherein the method further comprises adjusting both the excitation frequency and the excitation voltage used to produce the sensing signals, in conjunction with adjusting the touch-detection sensitivity.

3. The method of claim 1, wherein adjusting the touch-detection sensitivity comprises using a non-linear touch-detection threshold for evaluating an amplitude of the sensing signals, and wherein the non-linear touch-detection threshold is dependent upon the adjusted excitation voltage.

4. The method of claim 1, further comprising adjusting a touch-detection sensitivity used for reading secondary adjacent sensing lines to account for the adjusted excitation voltage used with respect to the adjacent sensing lines, each secondary adjacent sensing line running adjacent to a respective one of the adjacent sensing lines.

5. The method of claim 1, wherein adjusting the touch-detection sensitivity comprises using a non-linear touch-detection threshold for evaluating an amplitude of the sensing signals.

6. The method of claim 1, further comprising at least one of:
skipping energization of the inoperative sensing line when reading the touch sensor for detection of touch inputs; or
skipping evaluation of a sensing signal output from the inoperative sensing line when reading the touch sensor for detection of touch inputs.

7. The method of claim 1, further comprising ignoring any sensing signal output from the inoperative sensing line and calculating a location of a touch input detected in the region of the touch surface that corresponds to the inoperative sensing line as a function of the sensing signal output from one of the adjacent sensing lines in relation to the sensing signal output from the other one of the adjacent sensing lines.

8. The method of claim 1, wherein the plurality of sensing lines comprises first and second pluralities of sensing lines with the sensing lines in one plurality running crisscross with the sensing lines in the other plurality, and wherein the method comprises:
detecting bounded sensing lines in either plurality, wherein any particular sensing line is a bounded sensing line if the particular sensing line is inoperative and the adjacent sensing lines are operative;
adjusting the touch-detection sensitivity used for evaluating sensing signals output from each pair of adjacent sensing lines; and
evaluating the sensing signals from each pair of adjacent sensing lines for touch-detection according to the adjusted touch-detection sensitivity.

9. The method of claim 1, further comprising sending signaling to a host processor of an electronic device that includes the apparatus and the touch sensor, to thereby enable software-based mitigation with respect to the inoperative sensing line affecting use of the touch sensor as an input to one or more software applications executing on the host processor.

10. The method of claim 1, wherein the plurality of sensing lines comprises capacitive lines configured for capacitance-based detection of touch inputs to the touch surface of the touch sensor.

11. An apparatus comprising:
read circuitry configured to interface with a touch sensor, the touch sensor having a plurality of sensing lines arranged for detecting touch inputs to a touch surface of the touch sensor; and
processing circuitry configured to:
control the read circuitry to excite respective sensing lines of the touch sensor and read corresponding sensing signals output from the touch sensor;
determine that a sensing line of the touch sensor is not operative and that respective sensing lines running adjacent to the inoperative sensing line are operative;
adjust a touch-detection sensitivity used for evaluating sensing signals output from the adjacent sensing lines, to provide touch detection within a region of the touch surface that corresponds to the inoperative sensing line and is bounded by the adjacent sensing lines;
adjust one or both of an excitation frequency or an excitation voltage used to produce the sensing signals, in conjunction with adjusting the touch-detection sensitivity; and
evaluate the sensing signals for touch-detection according to the adjusted touch-detection sensitivity.

12. The apparatus of claim 11, wherein the plurality of sensing lines comprises first and second pluralities of sensing lines with the sensing lines in one plurality running crisscross with the sensing lines in the other plurality, and wherein the processing circuitry is configured to:
detect bounded sensing lines in either plurality, wherein any particular sensing line is a bounded sensing line if the particular sensing line is inoperative and the adjacent sensing lines are operative;
adjust the touch-detection sensitivity used for evaluating sensing signals output from each pair of adjacent sensing lines; and
evaluate the sensing signals from each pair of adjacent sensing lines for touch-detection according to the adjusted touch-detection sensitivity.

13. The apparatus of claim 11, wherein the processing circuitry is configured to send signaling to a host processor of an electronic device that includes the apparatus and the touch sensor, to thereby enable software-based mitigation with respect to the inoperative sensing line affecting use of the touch sensor as an input to one or more software applications executing on the host processor.

14. The apparatus of claim 11, wherein the plurality of sensing lines comprises capacitive lines configured for capacitance-based detection of touch inputs to the touch surface of the touch sensor.

15. The apparatus of claim 11, wherein the processing circuitry is configured to perform at least one of:
skip energization of the inoperative sensing line when reading the touch sensor for detection of touch inputs; or
skip evaluation of a sensing signal output from the inoperative sensing line when reading the touch sensor for detection of touch inputs.

16. An electronic device comprising a touch sensor and the apparatus according to claim 11.

\* \* \* \* \*